US010791672B2

(12) United States Patent
Berglund et al.

(10) Patent No.: US 10,791,672 B2
(45) Date of Patent: Oct. 6, 2020

(54) LAWN MOWER INCLUDING AN OPERATOR CONTROLLED DISCHARGE BAFFLE

(71) Applicant: Ariens Company, Brillion, WI (US)

(72) Inventors: Brent P. Berglund, Brillion, WI (US); Kevin A. Spatchek, Greenleaf, WI (US); Daniel J. Gindt, Appleton, WI (US)

(73) Assignee: Ariens Company, Brillion, WI (US)

( * ) Notice: Subject to any disclaimer, the term of this patent is extended or adjusted under 35 U.S.C. 154(b) by 127 days.

(21) Appl. No.: 16/137,767

(22) Filed: Sep. 21, 2018

(65) Prior Publication Data
US 2019/0082592 A1 Mar. 21, 2019

Related U.S. Application Data

(60) Provisional application No. 62/561,525, filed on Sep. 21, 2017.

(51) Int. Cl.
A01D 34/71 (2006.01)
A01D 34/66 (2006.01)
A01D 101/00 (2006.01)

(52) U.S. Cl.
CPC .............. A01D 34/71 (2013.01); A01D 34/66 (2013.01); A01D 2101/00 (2013.01)

(58) Field of Classification Search
CPC ...... A01D 34/006; A01D 34/69; A01D 34/73; A01D 34/003; A01D 34/005; A01D 34/78;
(Continued)

(56) References Cited

U.S. PATENT DOCUMENTS 1,894,740 A 1/1933 August et al.
2,344,663 A 3/1944 Wood
(Continued)

FOREIGN PATENT DOCUMENTS

CN 201726671 U 2/2011
DE 9419175 U1 2/1995
(Continued)

OTHER PUBLICATIONS

Toro|Groundsmaster® 3280-D 4WD (30345),http://www.toro.com/en-gb/Golf/Mowers/Trim-Surround/Pages/Model.aspx?pid=Groundsmaster-3280-D-4WD, webpage available at least as early as Feb. 25, 2014 (3 pages).
(Continued)

Primary Examiner — Abigail A Risic
(74) Attorney, Agent, or Firm — Michael Best & Friedrich LLP

(57) ABSTRACT

A lawn mower includes a discharge baffle assembly coupled to a cutting deck pan adjacent an opening. The discharge baffle assembly includes a discharge chute extending outwardly from the cutting deck pan. The discharge baffle assembly also includes a baffle plate movable within a gap between the discharge chute and the cutting deck pan. The baffle plate is movable between a first position, in which the baffle plate substantially covers the opening of the cutting deck pan, and a second position, in which the baffle plate is spaced apart from the opening of the cutting deck pan. The discharge baffle assembly further includes an actuator coupled to the baffle plate. The actuator is operable to move the baffle plate relative to the opening of the cutting deck pan.

19 Claims, 16 Drawing Sheets

(58) Field of Classification Search
CPC ...... A01D 34/66; A01D 34/68; A01D 34/733; A01D 34/71
See application file for complete search history.

(56) References Cited

U.S. PATENT DOCUMENTS

| | | | |
|---|---|---|---|
| 2,833,101 A | 5/1958 | Batton | |
| 2,859,581 A | 11/1958 | Kroll et al. | |
| 2,920,436 A | 1/1960 | Benson | |
| 3,158,978 A | 12/1964 | Brewer | |
| 3,176,455 A | 4/1965 | Buchanan | |
| 3,293,836 A | 12/1966 | Heth | |
| 3,315,452 A | 4/1967 | Rossi | |
| 3,338,039 A | 8/1967 | Nightingale et al. | |
| 3,404,519 A * | 10/1968 | Demers | A01D 34/828 56/14.7 |
| 3,466,858 A | 9/1969 | Van Donkelaar | |
| 3,524,306 A | 8/1970 | Walter | |
| 3,636,686 A | 1/1972 | Meyer et al. | |
| 3,706,190 A | 12/1972 | Taub | |
| 3,750,378 A | 8/1973 | Thorud | |
| 3,884,020 A | 5/1975 | Dahl et al. | |
| 3,995,414 A | 12/1976 | Kerr et al. | |
| 4,008,559 A | 2/1977 | Lessig, III et al. | |
| 4,037,394 A | 7/1977 | Lindblad | |
| 4,047,367 A | 9/1977 | Thorud | |
| 4,084,284 A | 4/1978 | Hastings | |
| 4,226,074 A | 10/1980 | Mullet et al. | |
| 4,258,539 A | 3/1981 | Pearce et al. | |
| 4,310,998 A | 1/1982 | Cuba | |
| 4,326,370 A | 4/1982 | Thorud | |
| 4,951,449 A | 8/1990 | Thorud | |
| 5,090,183 A | 2/1992 | Thorud et al. | |
| 5,133,175 A * | 7/1992 | Dumbrell | A01D 34/828 56/17.4 |
| 5,195,311 A | 3/1993 | Holland | |
| 5,305,589 A | 4/1994 | Rodriguez et al. | |
| 5,398,491 A | 3/1995 | Hartley | |
| 5,442,902 A | 8/1995 | Mosley et al. | |
| 5,605,033 A | 2/1997 | Olmr | |
| 5,826,417 A | 10/1998 | Evans | |
| 6,330,783 B2 | 12/2001 | Oxley | |
| 6,751,937 B2 | 6/2004 | Kobayashi et al. | |
| 6,857,256 B2 * | 2/2005 | Strange | A01D 43/0635 56/17.4 |
| 6,874,309 B1 | 4/2005 | Bellis, Jr. | |
| 6,910,322 B2 | 6/2005 | Schroeder | |
| 6,971,224 B1 * | 12/2005 | Hancock | A01D 34/71 56/255 |
| 7,051,504 B2 | 5/2006 | Osborne | |
| 7,093,415 B2 | 8/2006 | Kallevig et al. | |
| 7,146,791 B2 | 12/2006 | Benway et al. | |
| 7,328,566 B2 | 2/2008 | Kallevig | |
| 7,360,352 B2 | 4/2008 | Samejima et al. | |
| 7,448,195 B2 | 11/2008 | Kohler | |
| 7,594,379 B2 * | 9/2009 | Nicholson | A01D 34/71 56/320.2 |
| 7,624,562 B2 * | 12/2009 | Kallevig | A01D 34/71 56/320.2 |
| 7,677,022 B2 | 3/2010 | Chenevert et al. | |
| 7,726,110 B2 | 6/2010 | Nicholson | |
| 7,775,027 B2 * | 8/2010 | Wang | A01D 34/71 56/320.2 |
| 8,104,255 B1 | 1/2012 | Hurst et al. | |
| 8,171,709 B1 | 5/2012 | Bedford | |
| 8,468,790 B2 | 6/2013 | Grobmeier et al. | |
| 8,539,745 B2 | 9/2013 | Schmidt et al. | |
| 8,607,461 B2 | 12/2013 | Kazuyoshi et al. | |
| 9,066,469 B2 | 6/2015 | Kimura et al. | |
| 9,277,689 B2 | 3/2016 | Luking | |
| 9,629,307 B2 | 4/2017 | Gaeddert et al. | |
| 9,867,332 B2 * | 1/2018 | Lee | A01D 34/71 |
| 2008/0134654 A1 * | 6/2008 | Kohler | A01D 34/71 56/320.2 |
| 2009/0301050 A1 * | 12/2009 | Kohler | A01D 34/71 56/320.2 |
| 2015/0359169 A1 * | 12/2015 | Weems | A01D 34/664 56/14.7 |

FOREIGN PATENT DOCUMENTS

| | | |
|---|---|---|
| DE | 19629337 A1 | 1/1998 |
| EP | 0135459 A1 | 3/1985 |
| GB | 653983 A | 5/1951 |
| WO | WO1993022897 A1 | 11/1993 |
| WO | WO2010140904 A1 | 12/2010 |

OTHER PUBLICATIONS

Toro Groundsmaster 7200 Side Discharge 24hp 72" Cut 30360|Mowers Galore, http://www.mowersgalore.com.au/zero-tu rn-ride-on-lawn-mowers/groundsmaster-series/display/828-toro-groundsmaster-7200-side-discharge-24hp-72-cut-30360, webpage available at least as early as Feb. 25, 2014 (6 pages).

Trimmer Trap Products—Advanced Mower, http://www.advancedmower.com/trimmertrap/accessories.htm, webpage available at least as early as Feb. 25, 2014 (7 pages).

* cited by examiner

LAWN MOWER INCLUDING AN OPERATOR CONTROLLED DISCHARGE BAFFLE

CROSS-REFERENCE TO RELATED APPLICATION

This application claims the priority to U.S. Provisional Application Ser. No. 62/561,525, filed Sep. 21, 2017, the entire contents of which are hereby incorporated by reference herein.

FIELD OF THE INVENTION

The present invention relates to lawn mowers and, more particularly, to discharge baffle assemblies for lawn mowers.

SUMMARY

In one embodiment, the invention provides a lawn mower including a frame, a prime mover supported by the frame, a plurality of ground engagement elements moveably coupled to the frame and driven by the prime mover to propel the lawn mower, and a cutting deck pan supported by the frame. The cutting deck pan defines an opening. The lawn mower also includes a cutting blade mounted below the cutting deck pan to cut vegetation under the cutting deck pan, and a discharge baffle assembly coupled to the cutting deck pan adjacent the opening. The discharge baffle assembly includes a discharge chute extending outwardly from the cutting deck pan. The discharge chute defines a passageway configured to direct cut vegetation out from the opening of the cutting deck pan. The discharge baffle assembly also includes a baffle plate movable within a gap between the discharge chute and the cutting deck pan. The baffle plate is movable between a first position, in which the baffle plate substantially covers the opening of the cutting deck pan, and a second position, in which the baffle plate is spaced apart from the opening of the cutting deck pan. The discharge baffle assembly further includes an actuator coupled to the baffle plate. The actuator is operable to move the baffle plate relative to the opening of the cutting deck pan.

In another embodiment, the invention provides a discharge baffle assembly for use with a lawn mower. The lawn mower includes a frame, a prime mover supported by the frame, a plurality of ground engagement elements moveably coupled to the frame and driven by the prime mover to propel the lawn mower, a cutting deck pan supported by the frame and defining an opening, and a cutting blade mounted below the cutting deck pan to cut vegetation under the cutting deck pan. The discharge baffle assembly includes a discharge frame configured to be coupled to the cutting deck pan adjacent the opening, and a discharge chute supported by the discharge frame and configured to extend outwardly from the cutting deck pan. The discharge chute defines a passageway configured to direct cut vegetation out from the opening of the cutting deck pan. The discharge baffle assembly also includes a baffle plate supported by the discharge frame and movable within a gap between the discharge chute and the discharge frame. The baffle plate is movable between a first position, in which the baffle plate is configured to substantially cover the opening of the cutting deck pan, and a second position, in which the baffle plate is configured to be spaced apart from the opening of the cutting deck pan. The discharge baffle assembly further includes an actuator coupled to the baffle plate. The actuator is operable to move the baffle plate relative to the opening of the cutting deck pan.

Other aspects of the invention will become apparent by consideration of the detailed description and accompanying drawings.

DETAILED DESCRIPTION

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways. Also, it is to be understood that the phraseology and terminology used herein is for the purpose of description and should not be regarded as limiting.

Figure 1:
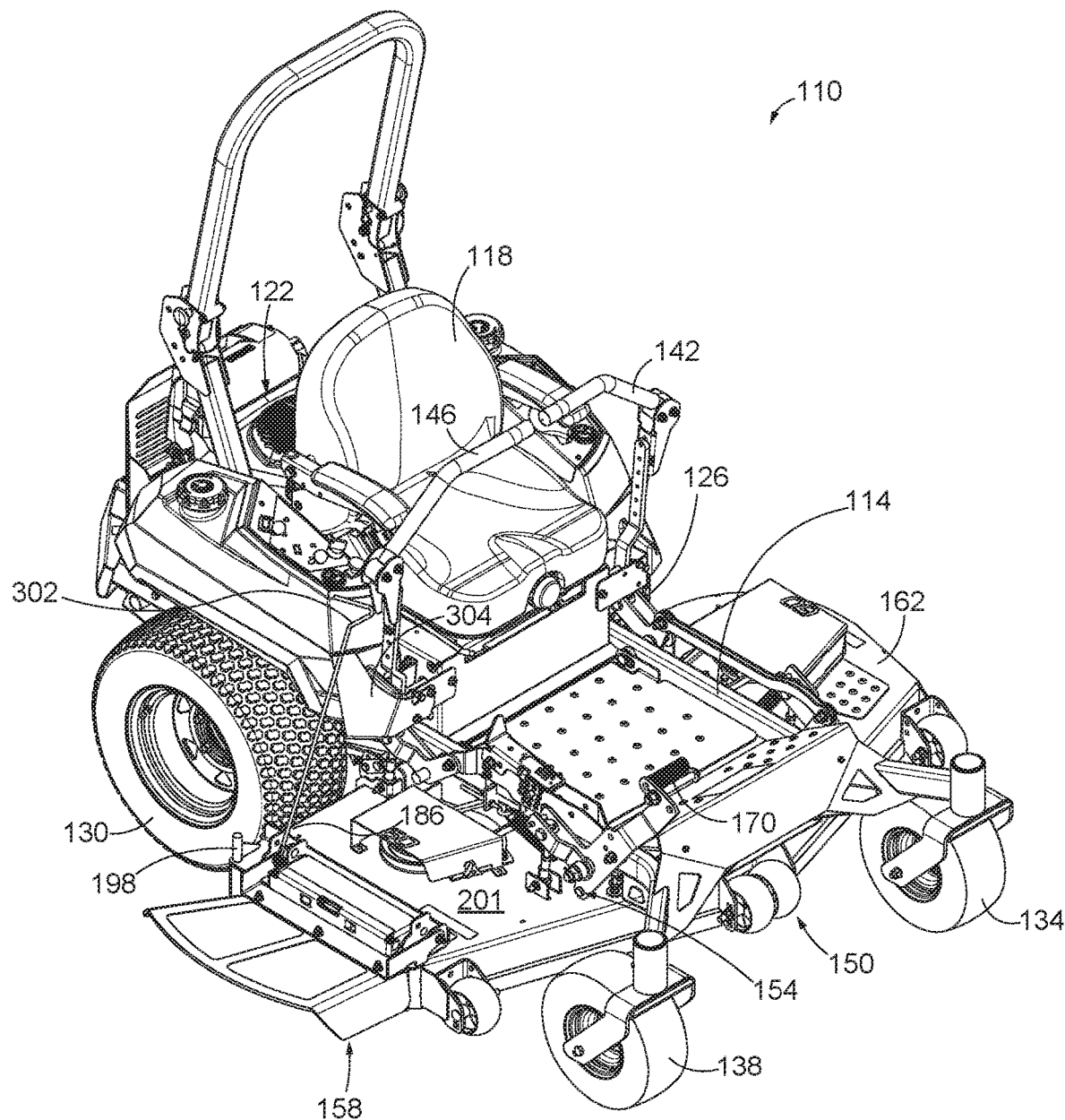
FIG. 1 is a perspective view of a lawn mower including a discharge baffle assembly according to the present invention.
Figure 2:
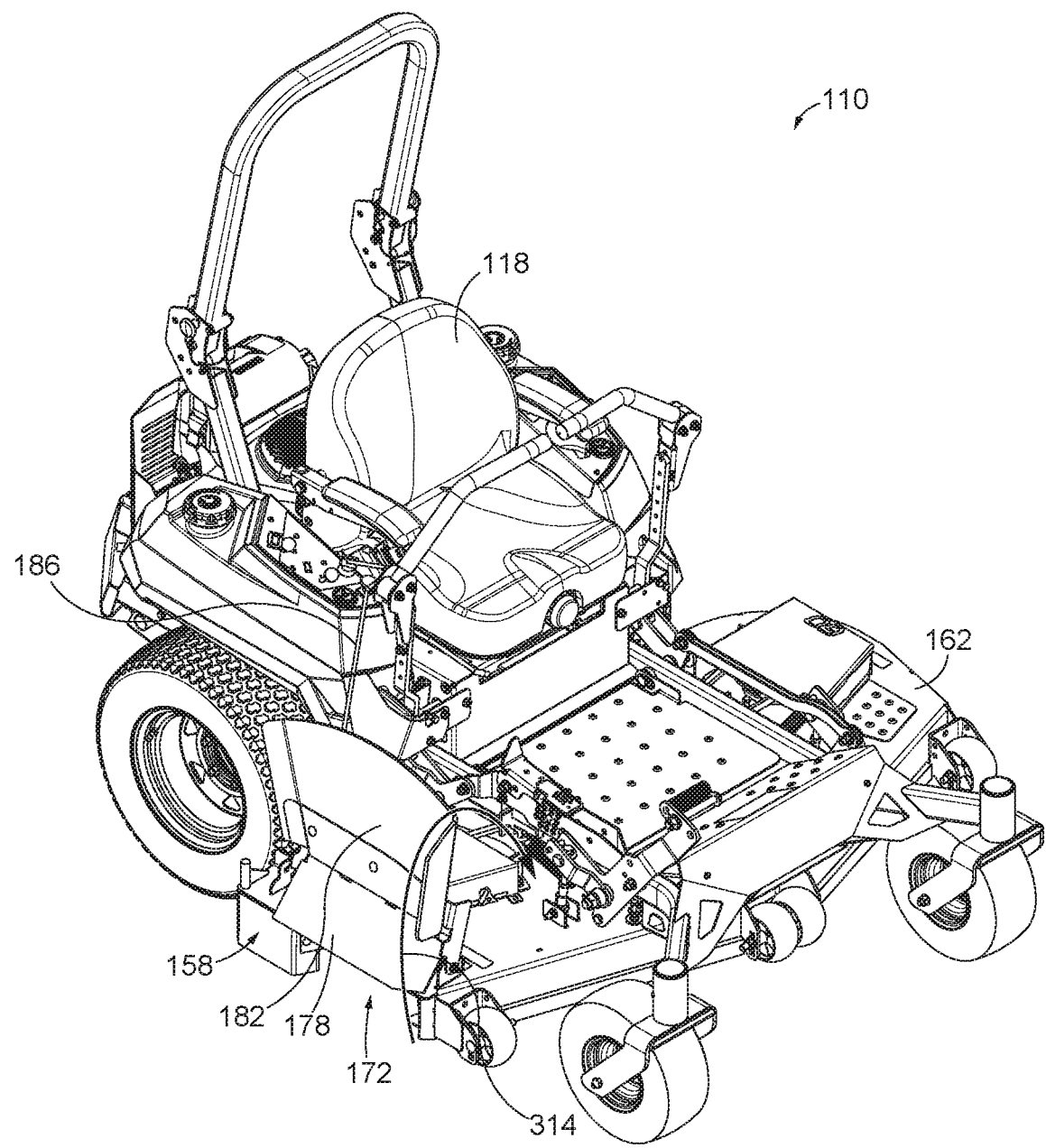
FIG. 2 is a perspective view of the lawn mower of FIG. 1, illustrating a baffle plate of the discharge baffle assembly in a raised position and a discharge chute of the baffle plate assembly in a raised position.

FIGS. 1 and 2 illustrate a lawn mower 110 including a frame 114, a seat 118, a prime mover 122, left and right driven ground engagement elements 126, 130, left and right passive ground engagement elements 134, 138, left and right control arms 142, 146, a deck assembly 150, a deck lifting assembly 154, and a discharge baffle assembly 158. The terms "front," "rear," "left," and "right" will be used in this specification from the perspective of an operator seated on the lawn mower 110 during ordinary operation. In the illustrated embodiment, the ground engagement elements are wheel, although in other embodiments, the ground engagement elements may be tracks, treads, etc. Although the invention is described with reference to a ride-on lawn mower (in which the operator sits in the seat 118 during operation), the invention is applicable to other types of lawn mowers, including walk-behind lawn mowers (in which an operator stands and walks behind the mower during operation), stand-on lawn mowers (in which an operator stands on the mower during operation), tractors (in which a steering wheel is used instead of control arms), and autonomous mowers (which are self-steering mowers).

The frame 114 is supported by the driven wheels 126, 130 and passive wheels 134, 138 above the ground, and in turn supports the other components of the lawn mower 110.

The prime mover 122 is supported by the frame 114 generally behind the seat 118. The prime mover 122 is coupled to and drives the other components of the lawn mower 110, such as the wheels 126, 130. In some embodiments, the prime mover 122 may be, for example, a gasoline powered internal combustion engine, but may alternatively be any other type of prime mover such as an electric motor, a hybrid gas/electric motor, a fuel cell, or any other suitable device operating on a suitable fuel.

The left and right driven wheels 126, 130 are rotatably coupled to the frame 114 behind the deck assembly 150 and interconnected with the prime mover 122. In some embodiments, the wheels 126, 130 are driven by the prime mover 122 through a power transmission and suitable hydraulic pumps and motors. The hydraulic pumps and motors are manipulated with the left and right control arms 142, 146, with the left control arm 142 controlling the direction and speed of rotation of the left driven wheel 126, and the right control arm 146 controlling the direction and speed of rotation of the right driven wheel 130. The wheels 126, 130 propel the lawn mower 110 in a direction of travel (e.g., forward or reverse).

The left and right passive wheels 134, 138 are coupled to the frame 114 in front of the deck assembly 150. The passive wheels 134, 138 are not driven by the prime mover 122 (or any other motors), but are free to rotate relative to the frame 114. In the illustrated embodiment, the passive wheels 134, 138 are caster wheels.

The control arms 142, 146 are pivotally coupled to the frame 114 adjacent the seat 118 and interconnected with the transmissions of the drive wheels 126, 130. The control arms 142, 146 are independently movable to control the drive speed and direction of the wheels 126, 130. The illustrated lawn mower 110 may be referred to as a zero-turn-radius lawn mower or ZTR lawn mower because when one of the control arms 142, 146 is pressed full forward and the other control arm 142, 146 is pulled full rearward, the lawn mower 110 will move in a very tight radius owing to one wheel rotating forward and the other rotating backwards. A ZTR lawn mower steers through the speed and direction difference of the two driven wheels 126, 130.

Figure 5:
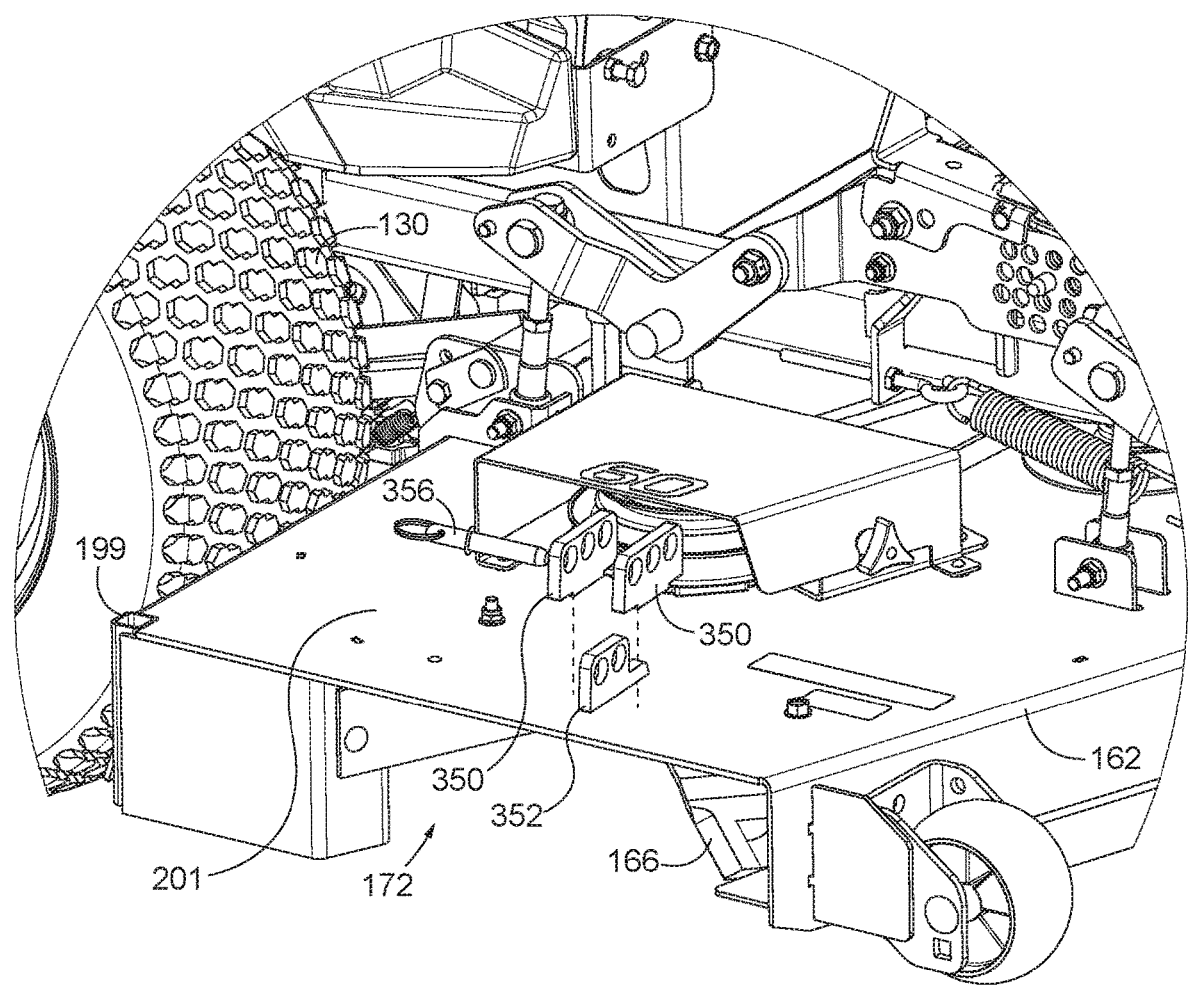
FIG. 5 is an enlarged view of a portion of the lawn mower of FIG. 1, illustrating a mounting aperture on a cutting deck pan.

The deck assembly 150 includes a cutting deck pan 162 and multiple cutting blades 166 (FIG. 5; only one is shown). The cutting deck pan 162 is supported under the frame 114 between the driven wheels 126, 130 and the passive wheels 134, 138. In other embodiments, the cutting deck pan 162 may be supported in front of the frame 114, behind the frame 114, or at other positions relative to the frame 114. The cutting blades 166 (FIG. 5) are mounted below the cutting deck pan 162 and are interconnected with the prime mover 122 (e.g., via a drive belt and sheaves). The prime mover 122 drives rotation of the cutting blades 166 to cut vegetation (e.g., grass) under the cutting deck pan 162.

The deck lifting assembly 154 is coupled between the frame 114 and the cutting deck pan 162 to adjust a height (e.g., raise and lower) of the cutting deck pan 162 relative to the frame 114. In the illustrated embodiment, the deck lifting assembly 154 includes a foot pedal 170 in the operator zone, which is defined as the region accessible by an operator of the lawn mower 110 during ordinary operation. The foot pedal 170 is interconnected with the deck lifting assembly 154, such that pivotal movement of the foot pedal 170 (e.g., under the influence of the operator's leg and foot) actuates the deck lifting assembly 154 to raise and lower the cutting deck pan 162. In other embodiments, other types of deck lift actuators (e.g., a hand lever) may be employed in place of or in addition to the foot pedal 170 to raise and lower the cutting deck pan 162.

As shown in FIGS. 1 and 2, the discharge baffle assembly 158 is coupled to and extends outwardly from an opening 172 of the cutting deck pan 162. The opening 172 defines a passageway from an area under the cutting deck pan 162 to an area outside of the cutting deck pan 162. The discharge baffle assembly 158 has a width that is wider than a width of the opening 172. This means that the discharge baffle assembly 158 encompasses the opening 172 when coupled to the cutting deck pan 162.

Figure 3:
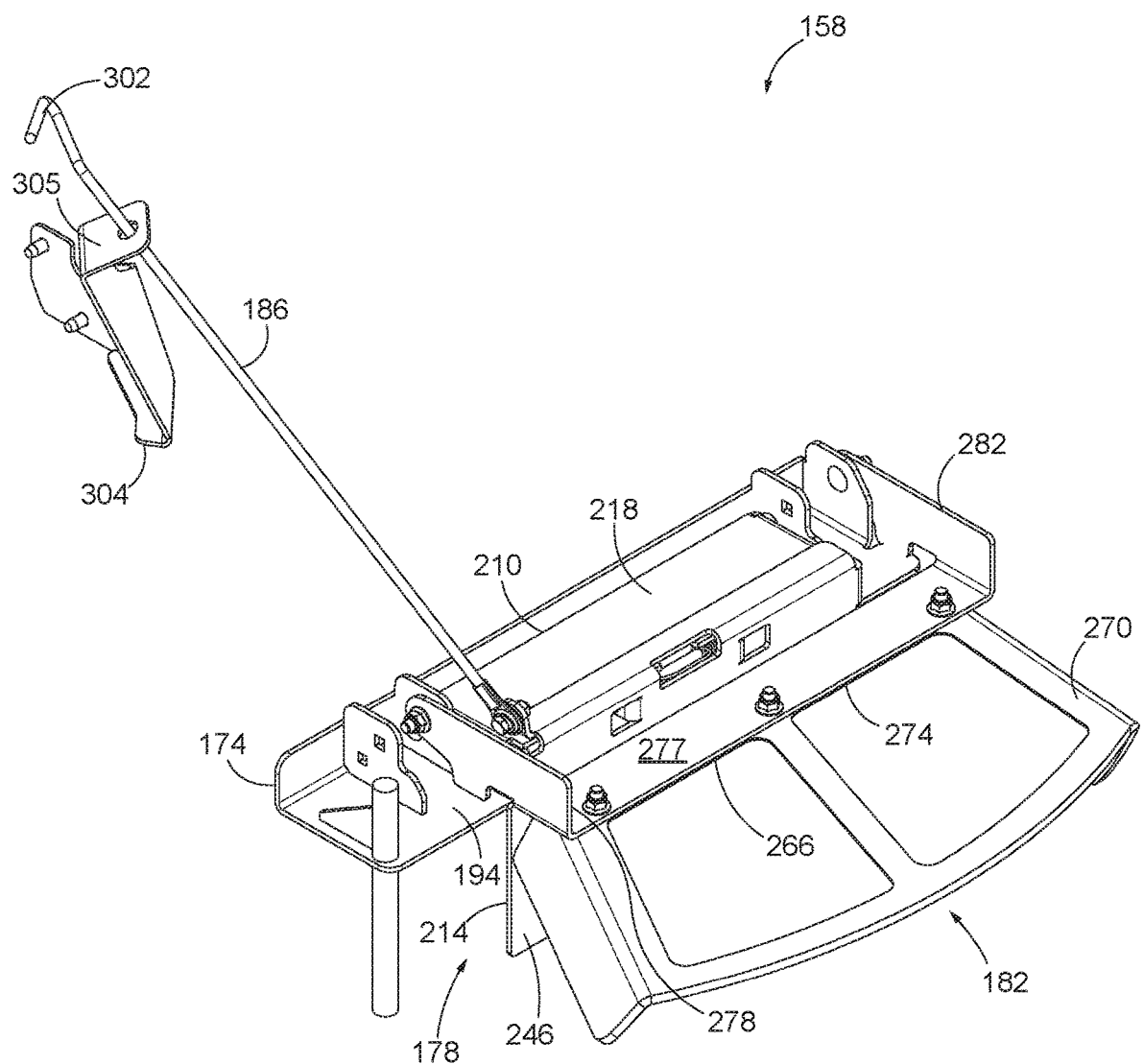
FIG. 3 is a perspective view of the discharge baffle assembly, illustrating the baffle plate in a lowered position and the discharge chute in a lowered position.
Figure 4:
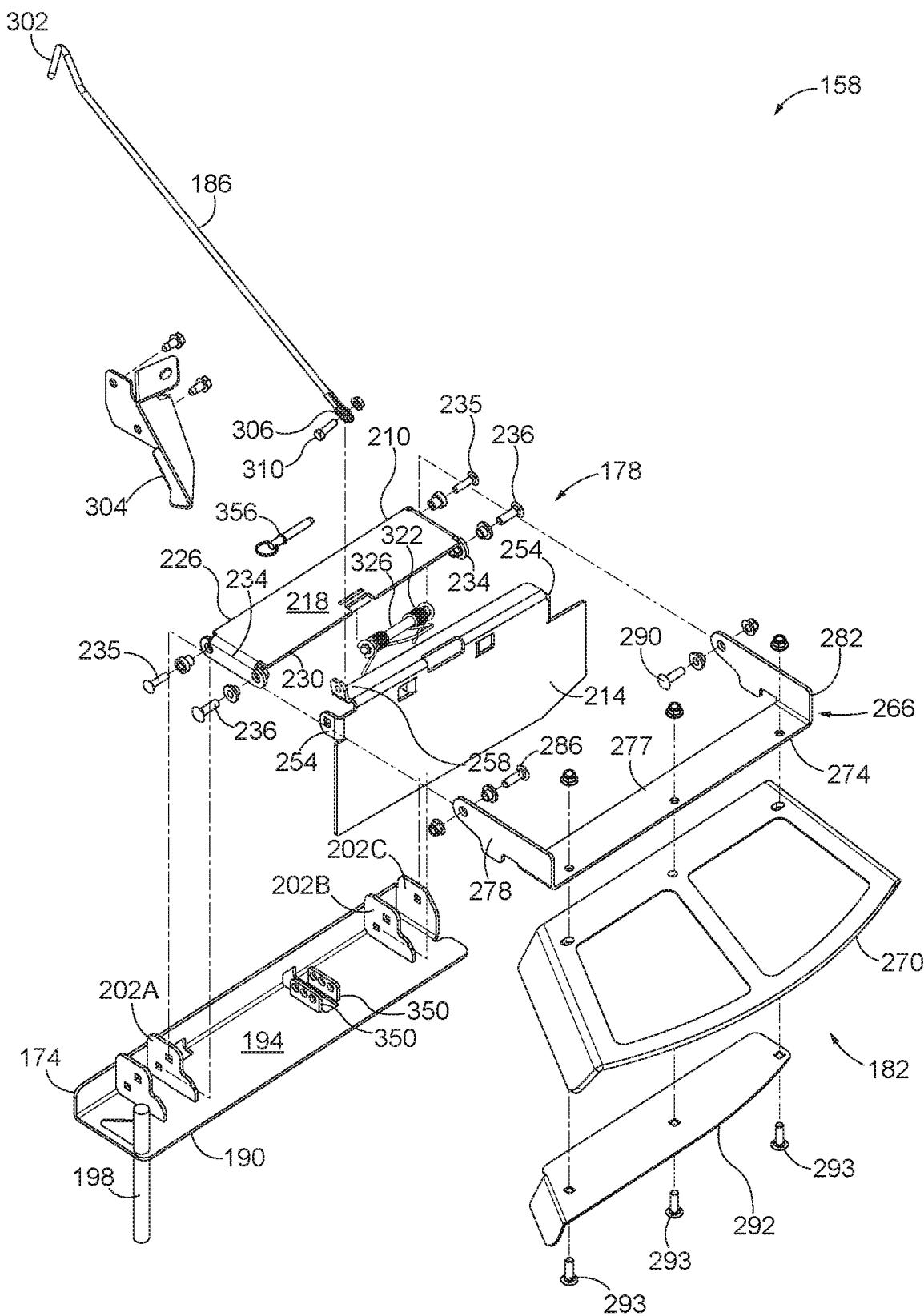
FIG. 4 is an exploded perspective view of the discharge baffle assembly of FIG. 3.

FIGS. 3-4 illustrate the discharge baffle assembly 158 that includes a discharge frame 174, a baffle plate 178, a discharge chute 182, and an actuator 186. The discharge frame 174 is a rigid member and is substantially rectangular in shape. The discharge frame 174 has a first surface 190 and a second surface 194. The first surface 190 and the second surface 194 are oriented parallel to each other. The discharge frame 174 has an aperture through which a mounting post 198 extends. In the illustrated embodiment, the mounting post 198 is cylindrical in shape.

FIG. 5 shows an enlarged view of the cutting deck pan 162 proximate the opening 172. When the discharge baffle assembly 158 couples to the lawn mower 110, the mounting post 198 (FIG. 3) is received in a mounting aperture 199 of the cutting deck pan 162. The mounting post 198 fits within the mounting aperture 199 such that the first surface 190 rests on an upper surface 201 of the cutting deck pan 162, opposite the cutting blade 166. The discharge baffle assembly 158 also includes two baffle brackets 350. When the discharge baffle assembly 158 rests on the upper surface 201, the baffle brackets 350 fit on either side of a deck bracket 352. The deck bracket 352 is arranged in a deck slot and is welded onto the cutting deck pan 162. A cotter pin 356 couples the two baffle brackets 350 to the deck bracket 352 to provide a means of releasably securing the discharge baffle assembly 158 to the cutting deck pan 162.

Returning to FIGS. 3-4, the discharge frame 174 also has a plurality of mounting brackets 202A-C. The illustrated mounting brackets 202A-C are welded onto and oriented orthogonally to the second surface 194 of the discharge frame 174. In other embodiments, the mounting brackets 202A-C may be separate pieces that are secured (e.g., welded) to the discharge frame 174.

The baffle plate 178 is movably coupled to the discharge frame 174. In the illustrated embodiment, the baffle plate 178 has a first section 210 and a second section 214 coupled together. Both of the first section 210 and the second section 214 are substantially rectangular in shape. Each section 210, 214 is formed of a rigid material, such as sheet metal. In other embodiments, the sections 210, 214 may be formed of other materials. The first section 210 has a top surface 218 and a bottom surface 222 (FIG. 8) opposite the top surface 218. The first section 210 also has a first edge 226 and a second edge 230 opposite the first edge 226. The first edge 226 and the second edge 230 are orthogonal to the top surface 218 and the bottom surface 222. The first section 210 further includes a first pair of projections 234 extending from the top surface 218 to below the bottom surface 222.

The second section 214 has a front or outwardly-facing surface 246, a rear or inwardly-facing surface 250 (FIG. 8) opposite the front surface 246. The second section 214 also has a second pair of projections 254. The second pair of projections 254 extend from the front surface 246 to behind the rear surface 250 so that the projections 254 are perpendicular to the front surface 246 and the rear surface 250. The second section 214 also has a third projection 258 that is substantially parallel (e.g., approximately 10° off parallel) to the second projections 254, and perpendicular to the front surface 246 and the rear surface 250.

The first projections 234 align with the second projections 254 and are coupled together with fasteners 236 so that the first section 210 and the second section 214 can pivot relative to each other. In the illustrated embodiment, the fasteners 236 are bolts, but may be other types of fasteners in alternative embodiments. In this arrangement, the rear surface 250 of the second section 214 is adjacent the second edge 230 of the first section 210. In this configuration, the first section 210 and the second section 214 are substantially perpendicular to each other.

The baffle plate 178 couples to the discharge frame 174 by aligning the first projections 234 with the mounting bracket 202A and the mounting bracket 202B. In the illustrated embodiment, the first section 210 has a width less than a width between mounting bracket 202A and mounting bracket 202B. The first section 210 is pivotably coupled to the mounting brackets 202A, 202B by fasteners 235. In the illustrated embodiment, the fasteners 235 are bolts, but may be other types of fasteners in alternative embodiments. The first section 210 is oriented between the mounting brackets 202A, 202B so that the bottom surface 222 is adjacent and parallel to the second surface 194 of the discharge frame 174. The rear surface 250 of the second section 214 is adjacent and perpendicular to the first surface 190 and the second surface 194 of the discharge frame 174.

The discharge chute 182 includes a chute support 266 and a chute cover 270. The chute support 266 has a base 274, a first extension 278, and a second extension 282. The first extension 278 and the second extension 282 extend from opposite ends of the base 274 toward the discharge frame 174 such that the chute support 266 is generally U-shaped. The base 274 has a first surface 276 (FIG. 8) and a second surface 277 opposite the first surface 276. The first extension 278 and the second extension 282 are perpendicular to the first surface 190 and the second surface 194. The base 274 has a width greater than a width between the mounting bracket 202A and the mounting bracket 202C. The first extension 278 couples to the mounting bracket 202A, and the second extension 282 couples to the mounting bracket 202C. The base 274 is oriented such that the first extension 278 and the second extension 282 extend upward from the second surface 277 of the base 274. In other embodiments, the base 274 is oriented such that the first extension 278 and the second extension 282 extend downward towards the second surface 194 of the discharge frame 174. A first fastener 286 (e.g., a screw, a bolt, or a similar member) couples the first extension member 278 together with the mounting bracket 202A. A second fastener 290 (e.g., a screw, a bolt, or a similar member) couples the second extension member 282 and the mounting bracket 202C. The fasteners 286, 290 pivotably couple the base 274 to the discharge frame 174.

The chute cover 270 is formed from a flexible material, such as rubber. In the illustrated embodiment a portion of the chute cover 270 is sandwiched between the base 274 of the chute support 266 and a mounting support 292. Fasteners 293 couple the mounting support 292 and the chute cover 270 to the base 274, and the chute cover 270 extends away from the discharge frame 174. The mounting support 292 is a relatively rigid member that helps maintain the shape of the chute cover 270.

The actuator 186 is coupled to the second section 214 of the baffle plate 178. In the illustrated embodiment, the actuator 186 includes an elongated rod. More specifically, the actuator 186 is a push-pull rod that is manually actuated to move the baffle plate 178 between the first and second positions. In other embodiments, the actuator 186 may include an electric motor, an air or hydraulic actuator, a spring mechanism, a solenoid, or other suitable mechanisms for moving the baffle plate 178. The rod 186 has a handle 302 at a first end and an eyelet 306 at a second end. The eyelet 306 and the third projection 258 aligned so that a fastener 310 (e.g., a bolt, a screw, a pin, etc.) can pass between the two members and couple the second section 214 to the actuator 186.

Referring again to FIGS. 1 and 2, the rod 186 extends from the baffle plate 178 towards the seat 118 so that that handle 302 is proximate the seat 118. A support bracket 304 couples to the frame 114 proximate the seat 118. The support bracket 304 defines an aperture 305 (FIG. 3) through which the rod 186 passes. While using the lawn mower 110, an operator seated in the seat 118 can reach the handle 302. This allows the operator to engage the rod 186 without leaving the seat 118.

Figure 6:
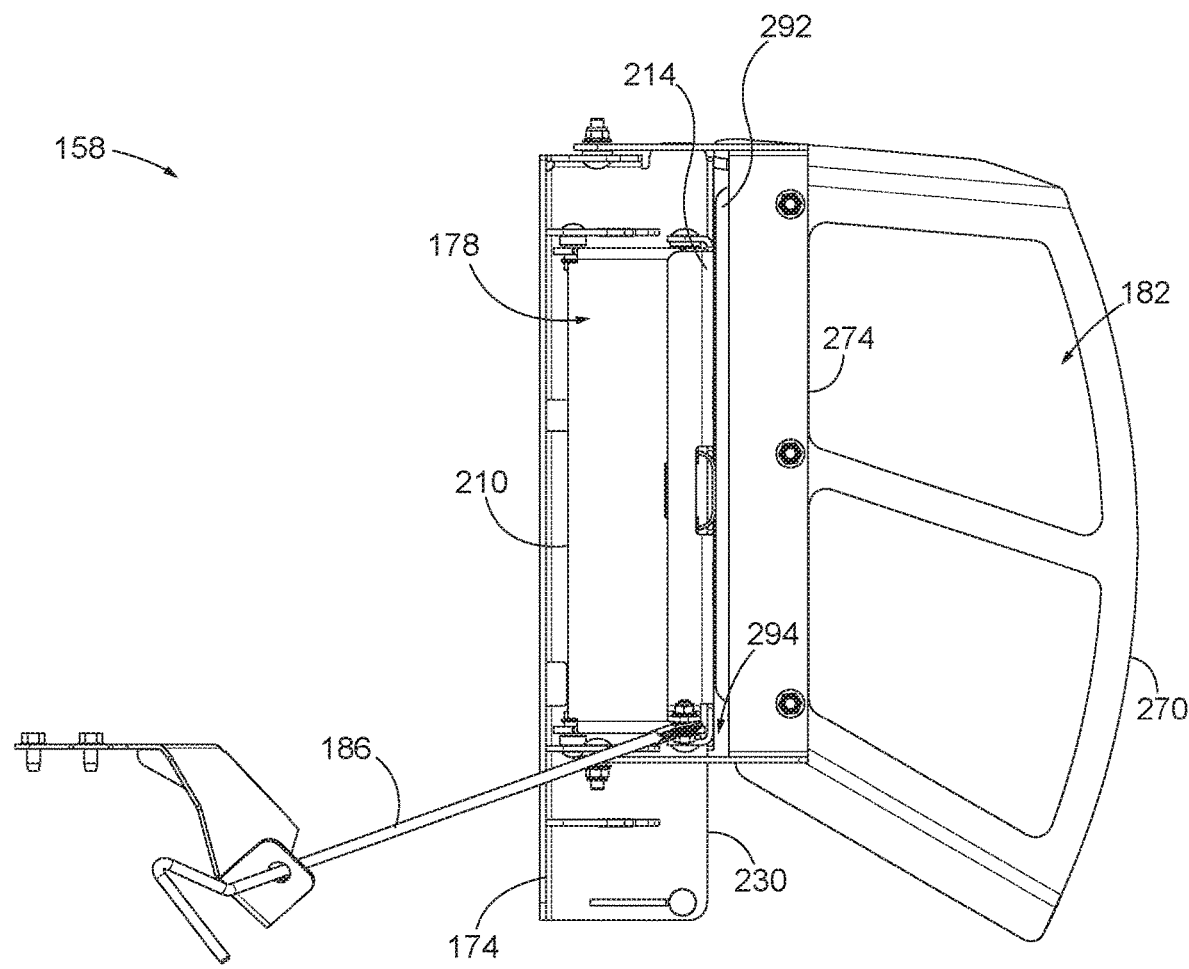
FIG. 6 is a top view of the discharge baffle assembly of FIG. 3.

FIG. 6 illustrates a top view of the discharge baffle assembly 158 with the baffle plate 178 and the discharge chute 182 in a first or lowered position. The base 274 and the chute cover 270 are coupled to the discharge frame 174 to create a gap 294 between an edge of the chute cover 270 and the second edge 230 of the discharge frame 174. The gap 294 extends the length of the base 274 and is an elongated narrow slot. The gap 294 is substantially rectangular in shape so that the gap 294 has a similar shape to a profile of the second section 214 of the baffle plate 178. This enables the second section 214 to move within the gap 294. In the illustrated embodiment, a small portion of the mounting support 292 also extends into the gap 294. The mounting support 292, in addition to a spring 322 (FIG. 8), helps keep the second section 214 positioned over the opening 172 (FIG. 5) of the cutting deck pan 162. In the illustrated embodiment, the spring 322 is a torsion spring.

Figure 7:
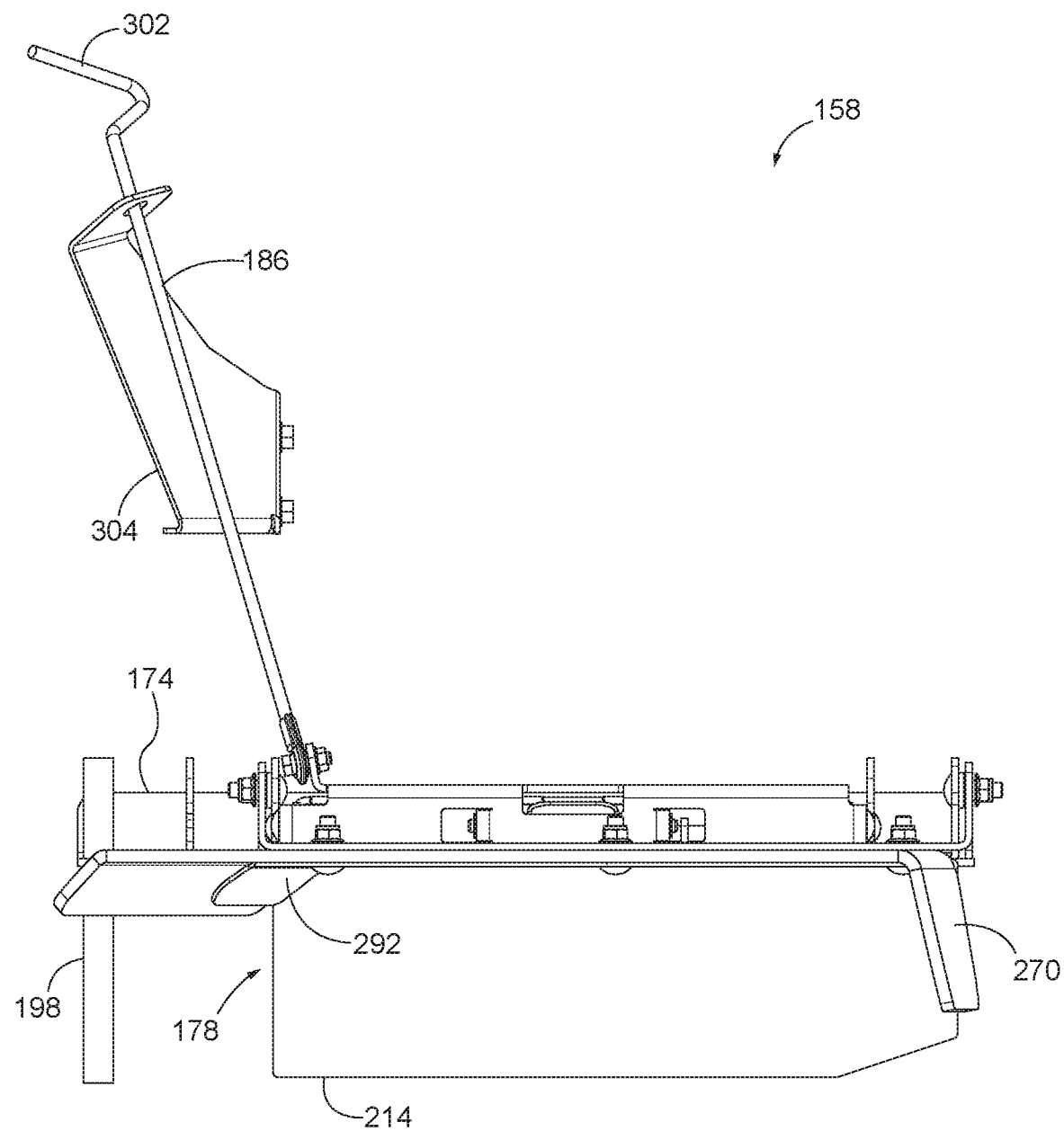
FIG. 7 is a side view of the discharge baffle assembly of FIG. 3.
Figure 9:
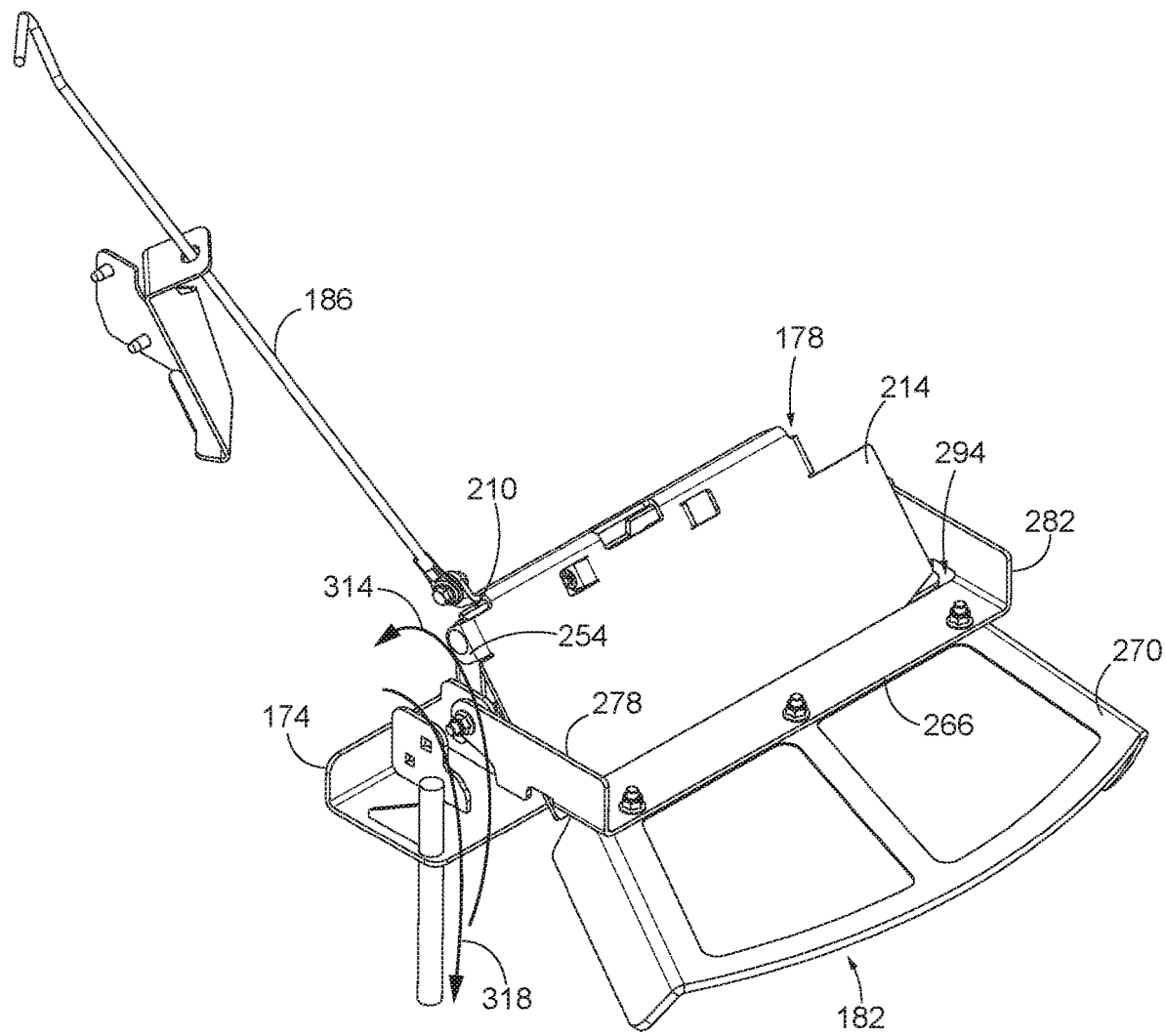
FIG. 9 is a perspective view of the discharge baffle assembly of FIG. 3, illustrating the baffle plate in the raised position and the discharge chute in the lowered position.

FIG. 7 illustrates a side view of the discharge baffle assembly 158 with the baffle plate 178 and the discharge chute 182 in the lowered position. In the lowered position, the second section 214 extends out of the gap 294 (FIG. 6). This enables the baffle plate 178 to move out of the gap 294 and into the raised position (FIG. 9).

Figure 8:
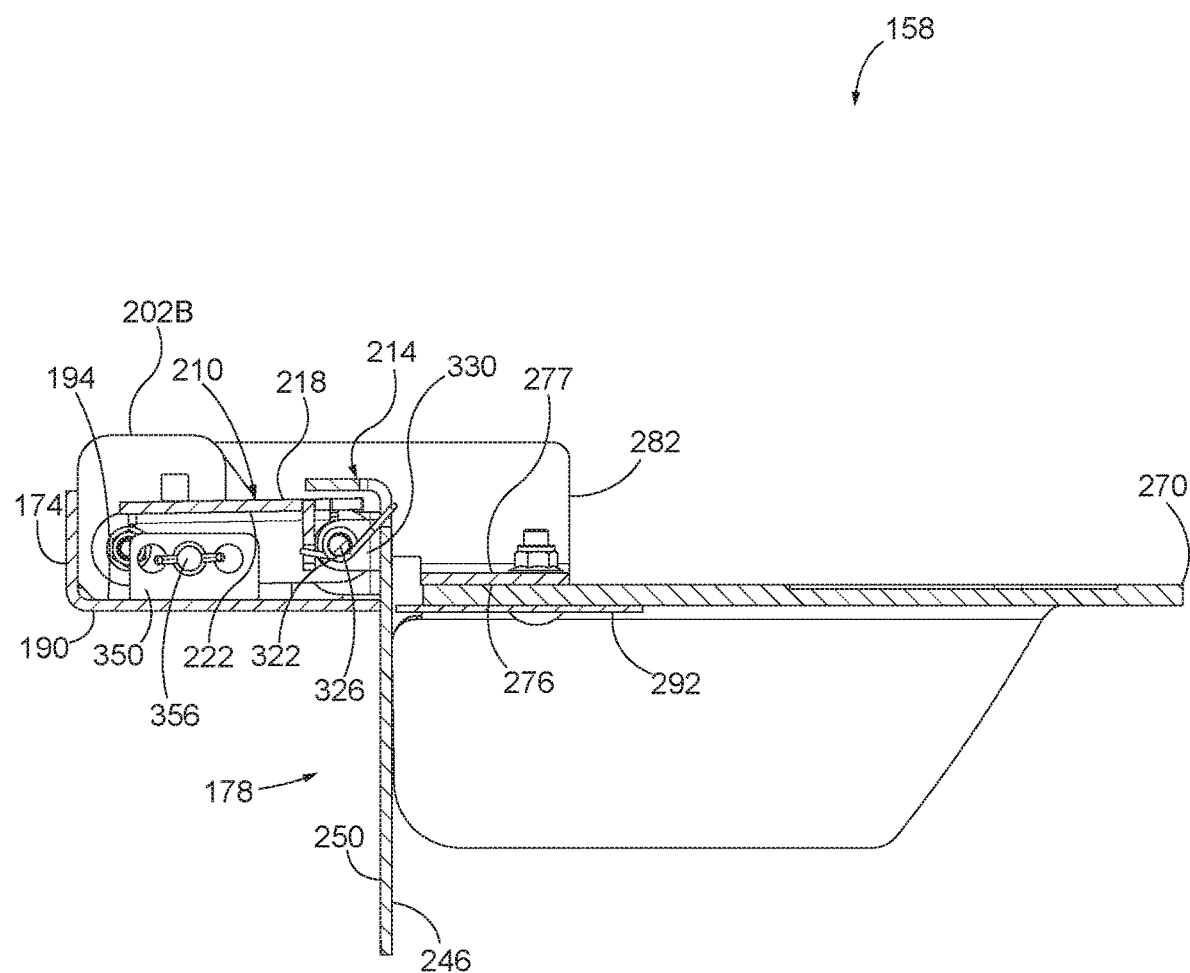
FIG. 8 is a cross-sectional view of the discharge baffle assembly taken along section line 8-8 of FIG. 7.

FIG. 8 illustrates a cross-sectional view of the discharge baffle assembly 158. The spring 322 is coupled between the first section 210 and the second section 214 of the baffle plate 178. In the illustrated embodiment, the spring 322 is wrapped around a pin 326. As shown in FIG. 4, the spring 322 has two coils. The pin 326 couples to a plurality of spring projections 330 adjacent the second section 214. The spring 322 biases the second section 214 towards the discharge frame 174. When the baffle plate 178 is in a first position, the spring 322 keeps the second section 214 adjacent the discharge frame 174. In addition, the spring 322 holds the second section 214 relatively tightly against the cutting deck pan 162 to reduce vibration and chatter. This arrangement also helps reduce the possibility of debris blowing through gaps between the cutting deck pan 162 and the baffle plate 178. Furthermore, if the baffle plate 178 contacts an obstacle while in the first position, the second section 214 can temporarily swing out to clear the obstacle, then be biased back against the cutting deck pan 162 by the spring 322. When the baffle plate 178 moves to the second position (FIG. 9), the spring 322 biases the second section 214 so the second section 214 contacts the discharge frame 174 as the second section 214 moves. As such, the cutting deck pan 162 can act as a scraper to clean debris off of the rear surface 250 of the second section 214.

The baffle plate 178 and the discharge chute 182 are each moveable with respect to the discharge frame 174. In the illustrated embodiment, the baffle plate 178 and the discharge chute 182 rotate independently from each other. The baffle plate 178 is rotatable about the fasteners 235, and the discharge chute 182 is rotatable about the fasteners 286. Additionally, the first section 210 and the second section 214 of the baffle plate 178 are rotatable with respect to one another about the fasteners 236 through the first projections 234 and the second projections 254.

Referring back to FIG. 3 the baffle plate 178 is illustrated in a first or lowered, position, and the discharge chute 182 is illustrated in a first or lowered position. In the lowered positions, the baffle plate 178 and the discharge chute 182 are oriented in positions in which they were assembled. With respect to the baffle plate 178, the first section 210 is oriented parallel to and adjacent the second surface 194 (FIG. 8) of the discharge frame 174, and the second section 214 is oriented perpendicular to the second surface 194 of the discharge frame 174. With respect to the base 274 of the discharge chute 182, the first surface 276 (FIG. 8) and the second surface 277 are parallel to the second surface 194 of the discharge frame 174. In this position, the second section 214 of the baffle plate 178 is positioned over the opening 172 (FIG. 5) of the cutting deck pan 162.

FIG. 9 illustrates the baffle plate 178 in a second or raised position, while the discharge chute 182 is in the lowered position. To achieve the raised position, the rod 186 is pulled towards the seat 118 (FIG. 2). This provides a force to the second section 214 of the baffle plate 178, which causes the first section 210 and the second section 214 to move with respect to one another and the discharge frame 174. When the force is provided to the baffle plate 178, the second section translates out of the gap 294 and pivots about an axis through the fasteners 236 on the second pair of projections 254. The movement of the second section 214 engages the first section 210 along the same axis where the second projections 254 also couple to the first projections 234 (FIG. 4). This causes the first section 210 to pivot about an axis through the fasteners 235 on the mounting bracket 202A and the mounting bracket 202B. Both the first section 210 and the second section 214 pivot in a first pivot direction 314 oriented towards the seat 118 (FIG. 2). Additionally, the second section 214 pivots with respect to the first section 210 in a second pivot direction 318 opposite the first pivot direction 314. These two pivot directions cause the first section 210 and the second section 214 to jack-knife with respect to one another. The second section 214 rotates over the discharge frame 174 and forms an oblique angle with the first section 210 in this position. While moving, the second section 214 can contact an edge of the discharge frame because of the bias of the spring 322. In this position, the second section 214 is spaced apart from the opening 172 of the cutting deck pan 162 (FIG. 2). Moving the baffle plate 178 to the raised position reduces the potential energy stored in the spring 322. This means that as the baffle plate 178 moves into the raised position, a spring force attempting to pull the second section 214 toward the first section 210 decreases. Additionally, since the second section 214 contacts the discharge frame 174, a frictional force opposes the movement of the second section 214 relative to the discharge frame 174. The force of gravity alone cannot counteract the decrease in spring potential energy and the frictional force between the second section 214 and discharge frame 174. This means that the baffle plate 178 will remain in the raised position until the rod 186 is pushed away from the seat 118 with a force that exceeds the spring force and frictional force. The spring 322 also biases the second section 214 toward the first section 210 to inhibit the baffle plate 178 from returning to the lowered position by the force of gravity alone.

Figure 10:
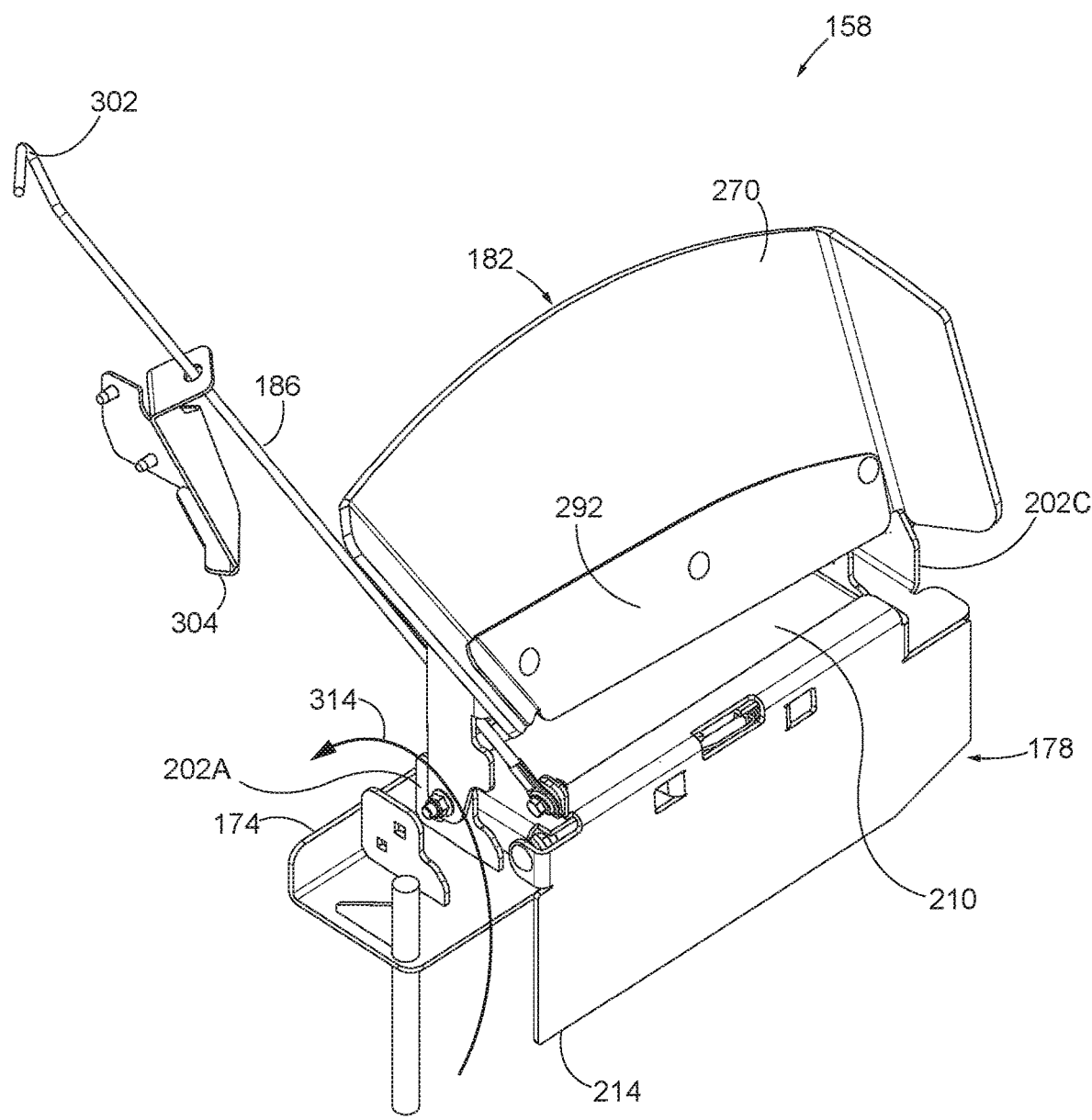
FIG. 10 is a perspective view of the discharge baffle assembly of FIG. 3, illustrating the baffle plate in the lowered position and the discharge chute in the raised position.

FIG. 10 illustrates the baffle plate 178 in the lowered position, and the discharge chute 182 in a second or raised position. In the illustrated embodiment, the discharge chute 182 is actuated by manual actuation. In other embodiments, the discharge chute 182 can be actuated by another means (e.g. mechanical, electrical, hydraulic, or any similar means). While an actuation force is applied to the discharge chute 182, the base 274 (FIG. 4) and the chute cover 270 pivot together about the fasteners 286 on the mounting bracket 202A and the mounting bracket 202C. The discharge chute 182 pivots in the first pivot direction 314 further than 90 degrees. That is, the discharge chute 182 pivots over vertical so that the discharge chute 182 leans toward the rod 186. Once in the raised position, the discharge chute 182 will not return to the lowered position unless a second actuation force is provided to the discharge chute 182. This inhibits the discharge chute 182 from returning to the lowered position by the force of gravity alone.

Figure 11:
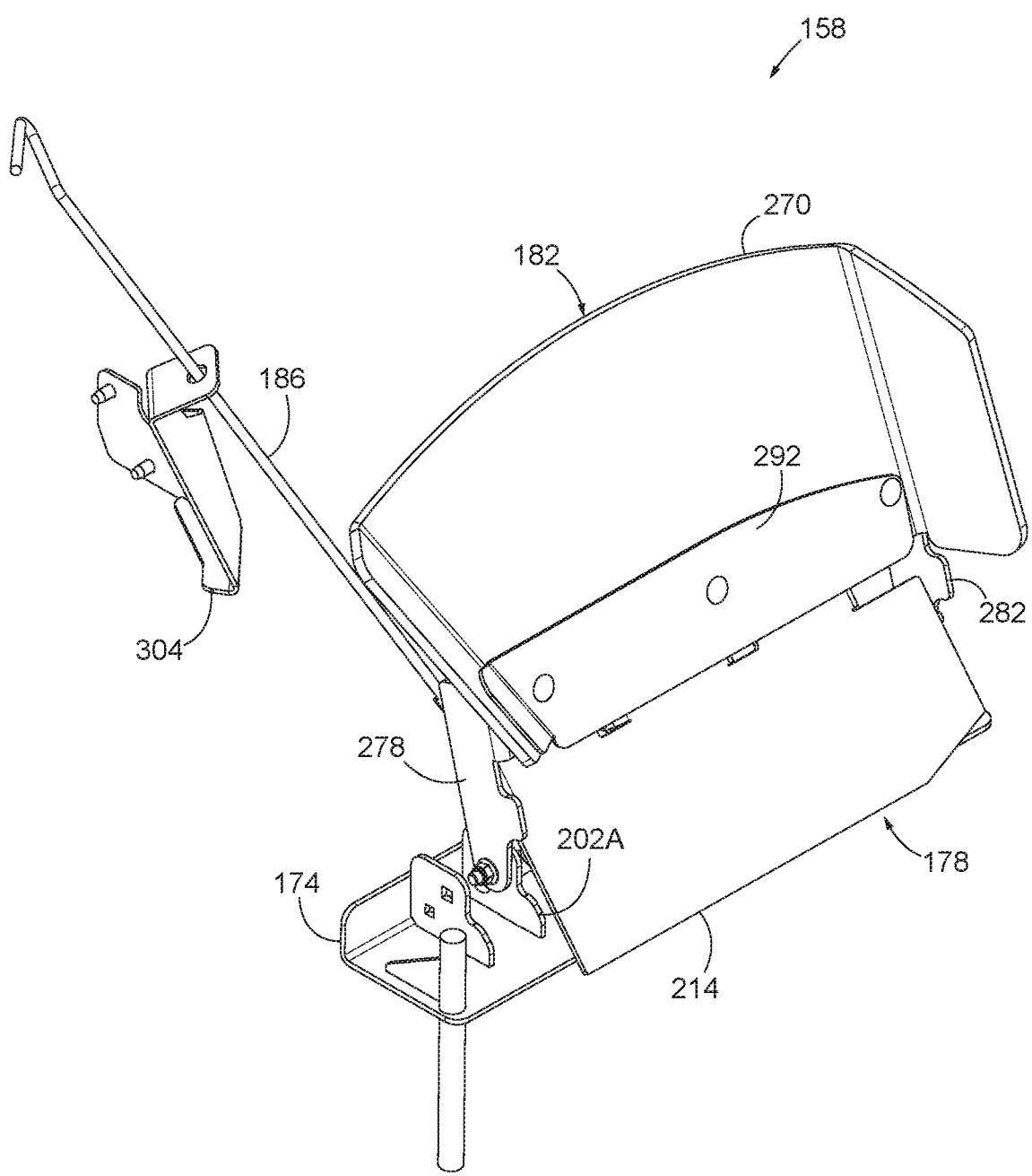
FIG. 11 is a perspective view of the discharge baffle assembly of FIG. 3, illustrating the baffle plate in the raised position and the discharge chute in the raised position.

FIG. 11 illustrates the baffle plate 178 in the raised position, and the discharge chute 182 in the raised position. The gap 294 (FIG. 6) allows the baffle plate 178 and the discharge chute 182 to actuate independently and at the same time. The gap 294 (FIG. 6) provides clearance between the baffle plate 178 and the discharge chute 182 in order to limit interference from either the baffle plate 178 or the discharge chute 182 when the other moves. But the gap 294 also allows the baffle plate 178 and the discharge chute 182 to actuate at the same time by pivoting the second section 214 over the discharge frame 174. The discharge chute 182 is still able to pivot further than 90 degrees while the baffle plate 178 is in the raised position. This allows the baffle plate 178 and the discharge chute 182 to be actuated (e.g., raised) at the same time while also the baffle plate 178 and the discharge chute 182 to be actuated independently from one another.

FIGS. 12-16 illustrate a discharge baffle assembly 558 that is substantially similar to discharge baffle assembly 158. Similar features include the same reference number, plus "400". Only differences between the discharge baffle assembly 558 and the discharge baffle assembly 158 will be described below.

Figure 12:
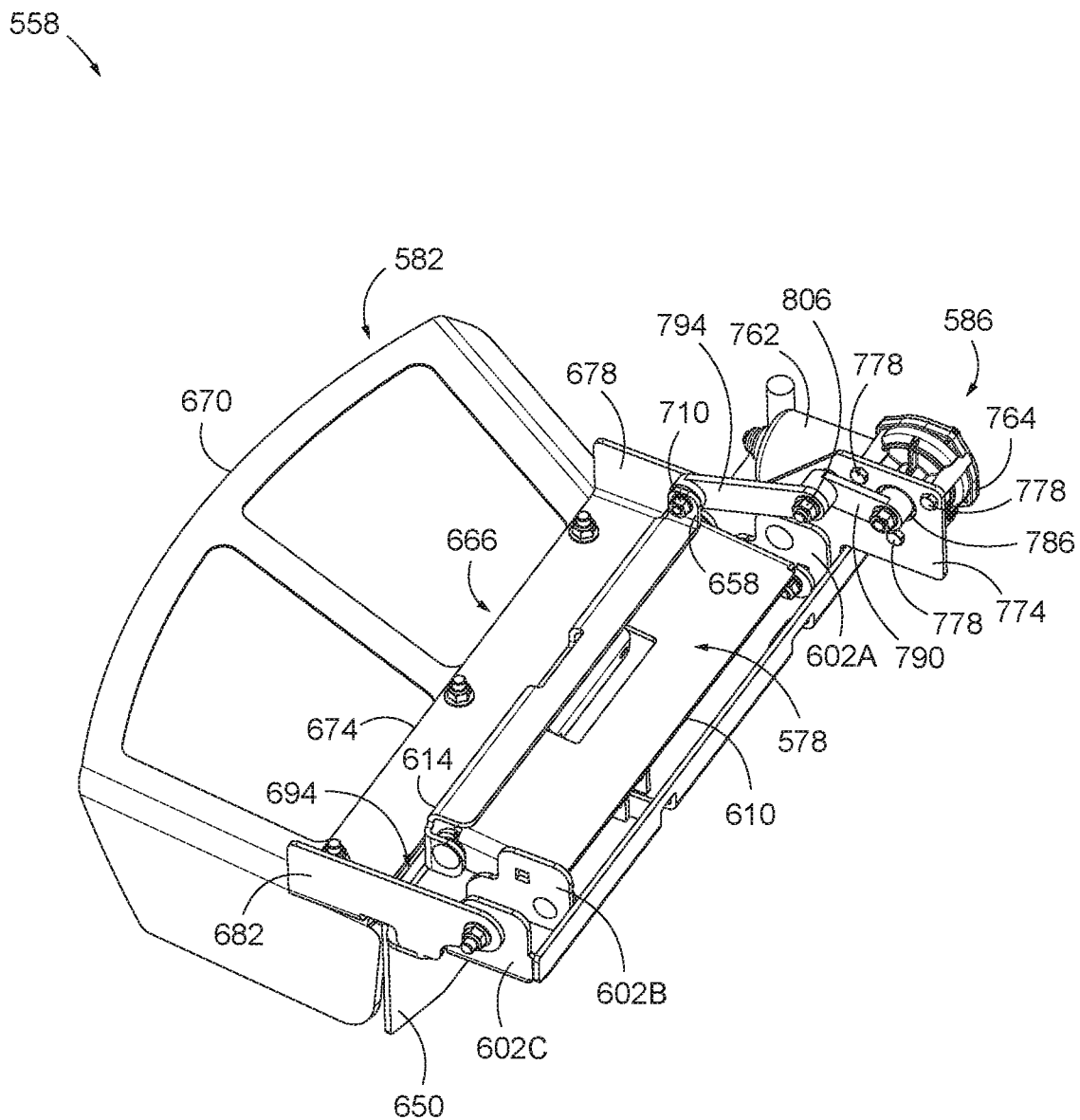
FIG. 12 is a perspective view of a discharge baffle assembly according to another embodiment, illustrating the baffle plate in a lowered position and the discharge chute in a lowered position.
Figure 13:
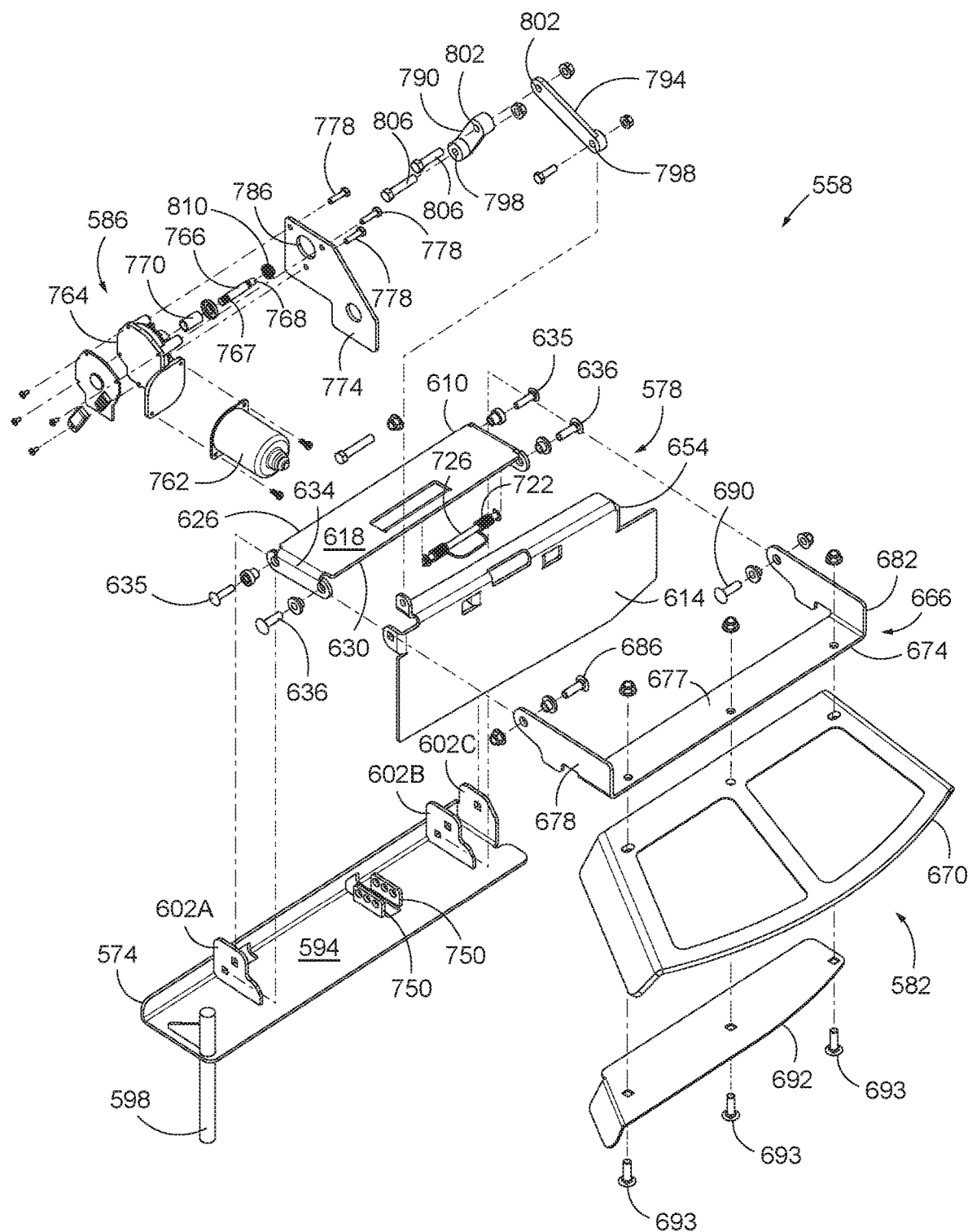
FIG. 13 is an exploded perspective view of the discharge baffle assembly of FIG. 12.

As shown in FIGS. 12 and 13, an actuator 586 is coupled to the second section 614 of the baffle plate 578. In the illustrated embodiment, the actuator 586 is an electric motor assembly. More specifically, the actuator 586 is a worm gear output of an output shaft 766 coupled to a motor (e.g., a DC motor) to move the baffle plate 578 between the first and second positions.

Figure 14:
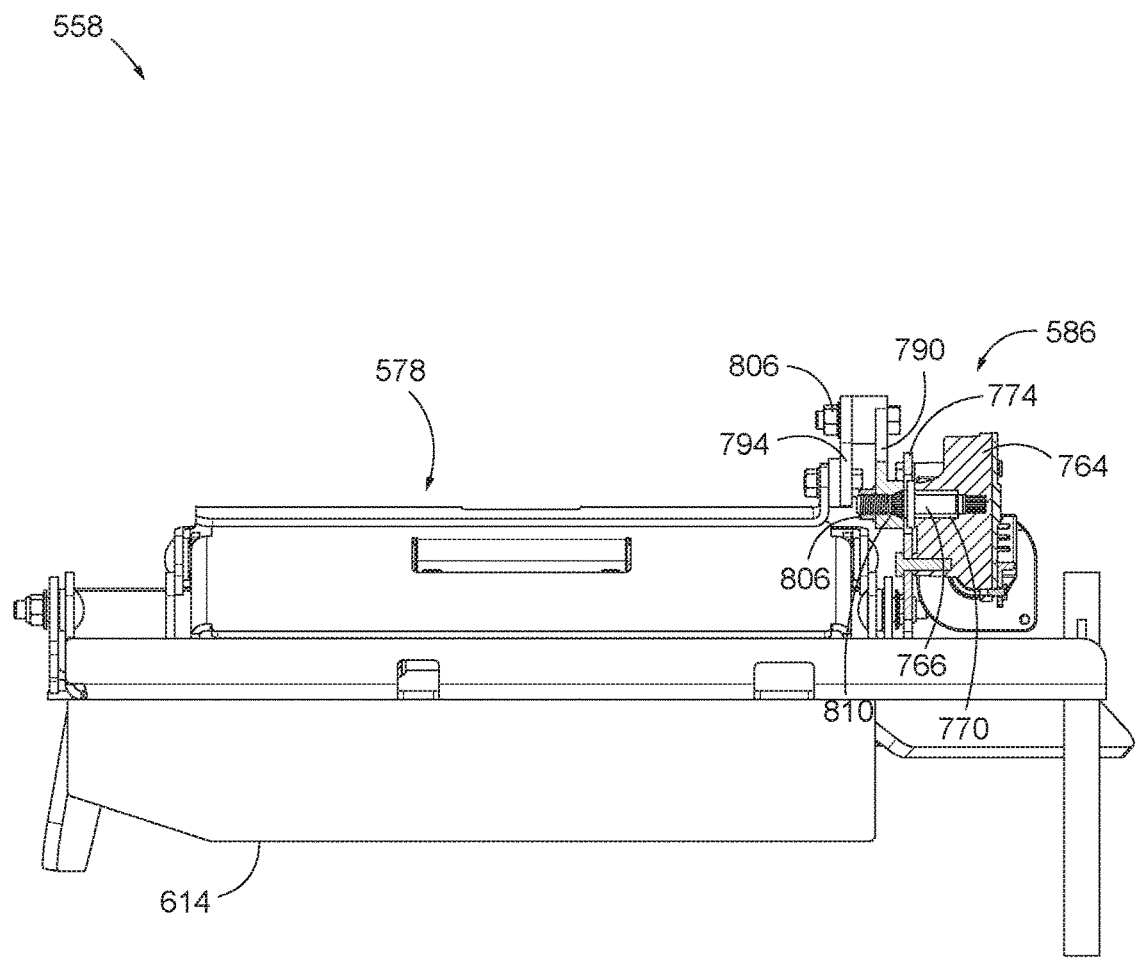
FIG. 14 is a cross-sectional view of the discharge baffle assembly of FIG. 12, taken along line 14-14.

FIGS. 13 and 14 illustrate the actuator 586 including a motor can 762 housing the DC motor and a gear box 764. In the illustrated embodiment, the motor can 762 houses a DC motor, which may be powered by a battery or an alternator of the lawn mower 110. The DC motor is coupled to a first end 767 of the output shaft 766. The DC motor is configured to drive the rotation of the output shaft 766. A bushing 770 surrounds the output shaft 766 and is configured to assist in rotational movement.

The gear box 764 is coupled to a mounting plate 774 by fasteners 778 (e.g., threaded screws). The mounting plate 774 is rigidly connected to the discharge frame 574, and in the illustrated embodiment, extends orthogonally from the second surface 594. A second or output end 768 of the output shaft 766 extends through an opening 786 of the mounting plate 774.

The actuator 586 further includes a first link 790 and a second link 794. In the illustrated embodiment, each link 790, 794 has an elongated body with a first hole 798 at one end of the body and a second hole 802 at another end of the body. A portion of the first link 790 extends through the opening 786 of the mounting plate 774, allowing the first hole 798 of the first link 790 to receive and engage the output end 768 of the output shaft 766. The first hole 798 of the second link 794 is aligned with the third projection 658 so that a fastener 710 (e.g., a bolt, a screw, a pin, etc.) can pass between the two members and couple the second section 614 to the second link 794. The second holes 802 of both links 790, 794 are also aligned so that a fastener 806 (e.g., a bolt, a screw, a pin, etc.) can pass between the two members and couple the links 790, 794 together, thereby coupling the second section 614 to the actuator 586.

Referring back to FIG. 12, the baffle plate 578 is illustrated in the lowered position. The third projection 658 is spaced furthest from the output shaft 766 while the baffle plate 578 is in the lowered position. The first link 790 and the second link 794 are arranged substantially linearly in order to extend the greatest distance and allow the second section 614 to be positioned through the gap 694.

Figure 15:
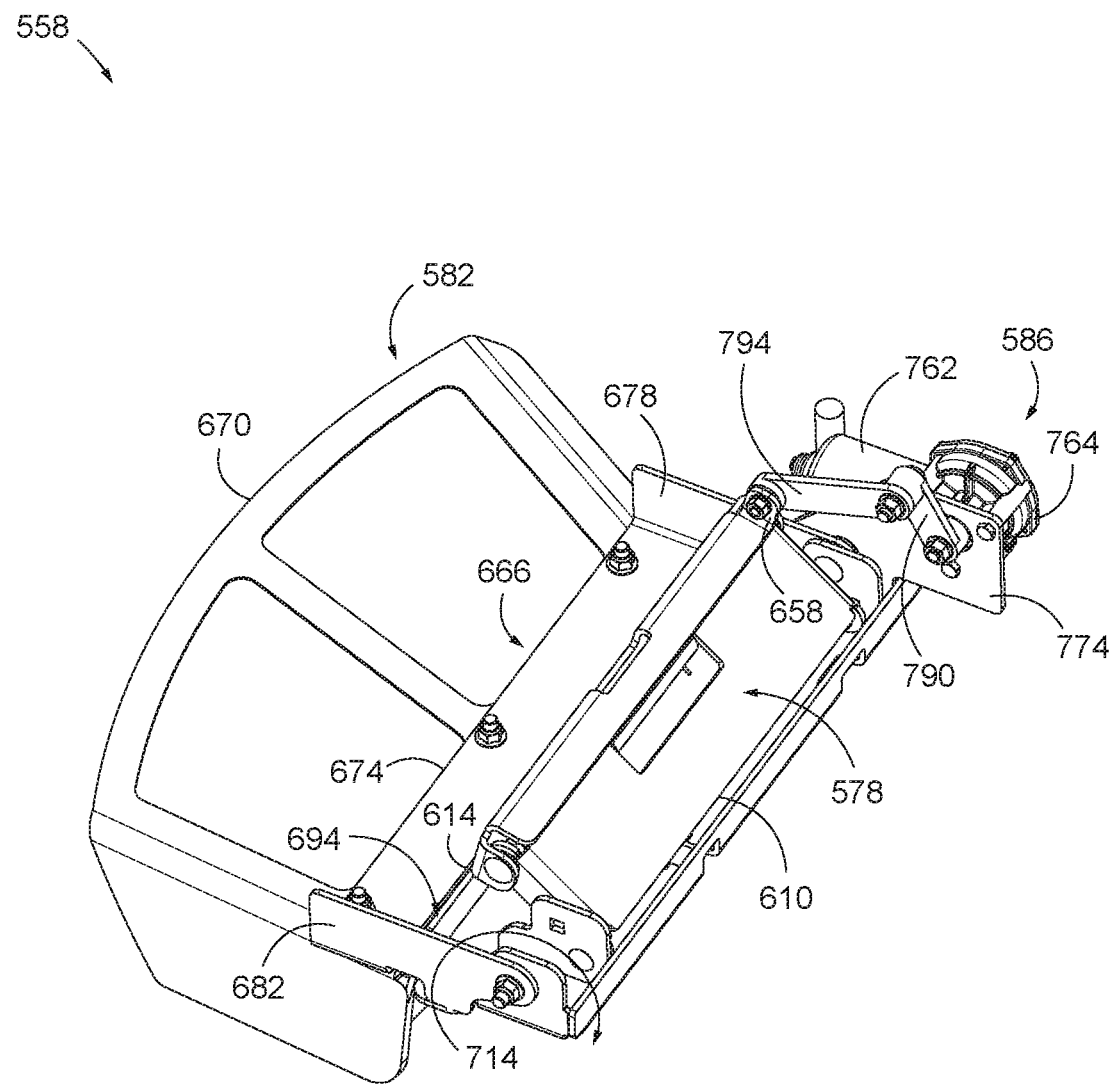
FIG. 15 is a perspective view of the discharge baffle assembly of FIG. 12, illustrating the baffle plate in a partially raised position and the discharge chute in the lowered position.
Figure 16:
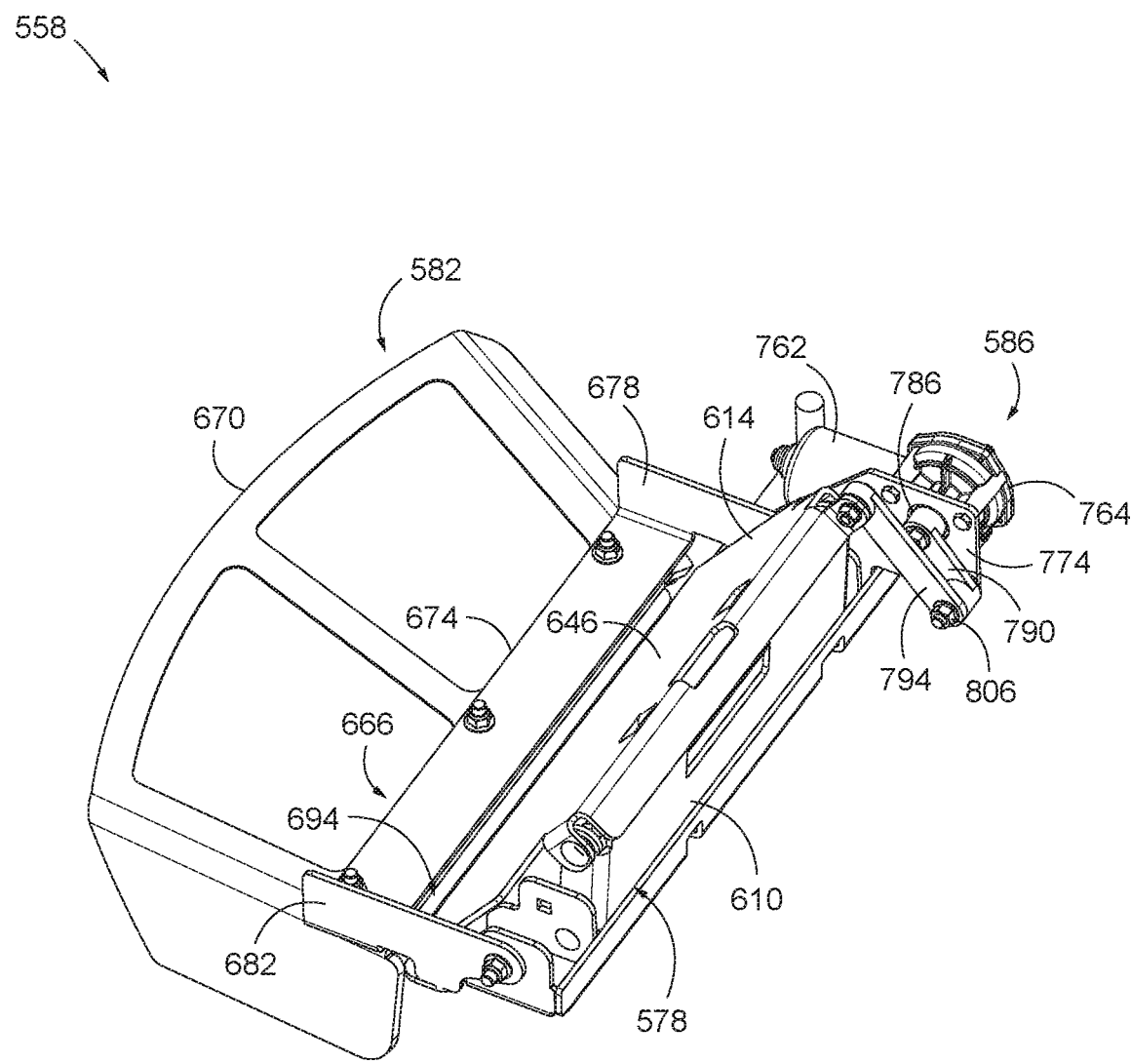
FIG. 16 is a perspective view of the discharge baffle assembly of FIG. 12, illustrating the baffle plate in a fully raised position and the discharge chute in the lowered position.

FIG. 15 illustrates the baffle plate 578 in a partially raised position. To achieve the partially raised position, the motor is actuated by a control (e.g., a button, a joystick, a switch—none shown) proximate the seat 118 (FIG. 1). This provides electrical current to the motor, causing the motor to rotate. Rotation of the motor drives the output shaft 766. A spline 810 (FIG. 13) is coupled to the output end 768 of the output shaft 766. The first link 790 is fixed relative to the output shaft 766, and rotation of the spline 810 on the output shaft 766 drives the first link 790. In the illustrated embodiment, the output shaft 766 and the first link 790 rotate in the first pivot direction 714. Rotation of the first link 790 causes the second link 794 to move (e.g., rotate and translate) toward the opening 786 of the mounting plate 774. The movement of the second link 794 provides a force to the baffle plate 578, and the second section 614 translates partially out of the gap 694 and pivots in the first pivot direction 714. In the illustrated embodiment, the first link 790 and the second link 794 are oblique with respect to one another in the partially raised position. The partially raised position is an intermediate position between the lowered position (FIG. 13) and fully raised position (FIG. 16). In the illustrated embodiment, the baffle plate 578 is not intended to remain in the intermediate position, but instead simply pass through as it travels to the raised or lowered positions.

FIG. 16 illustrates the baffle plate 578 in the raised position. In some embodiments, the user continuously actuates the control in order to bring the baffle plate 578 to the raised position; while in other embodiments, the user briefly actuates the control to raise the baffle plate 578. The first link 790 continues to rotate in the first pivot direction 714, and drive the movement of the second link 794 and the baffle plate 578. This moves the second section 614 fully out of the gap 694. The first and second links 790, 794 are substantially parallel in the raised position. In the illustrated embodiment, both the gears of the actuator 586 and the spring 722 may retain the baffle plate 578 in the raised position. The baffle plate 578 does not return to the lowered position until the user actuates the control again (continuously or briefly).

Referring back to FIGS. 1 and 2, during operation, the blade 166 cuts up vegetation underneath the cutting deck pan 162. Once the vegetation is cut, the vegetation is directed out from under the cutting deck pan 162 through the opening 172. The baffle plate 178 of the discharge baffle assembly 158 blocks the cut vegetation from passing through the opening 172.

In the lowered position (FIG. 1), the second section 214 of the baffle plate 178 covers the opening 172. The second section 214 substantially covers the opening 172 and cut vegetation remains in an area underneath the cutting deck pan 162. When the rod 186 is pulled and the baffle plate 178 moves into the second position, the second section 214 moves away from the opening 172 (FIG. 2). This allows the cut vegetation to pass through the opening 172. The discharge chute 182 directs the vegetation in a direction that extends outwardly from the opening 172. While in the lowered position, the chute cover 270 blocks the cut vegetation from exiting the cutting deck pan 162.

The illustrated embodiment allows the operator of the lawn mower 110 to selectively cover the opening 172 while sitting in the seat 118. This allows the operator to cover the opening 172 with the baffle plate 178 and avoid directing cut vegetation onto undesirable locations (e.g., flower beds, a driveway, etc.). When the operator moves the baffle plate 178 into the raised position, the bias of the spring 322 forces the second section 214 to rub against the second edge 230. The rubbing between the second section 214 and the second edge 230 removes some of the cut vegetation stuck to the second section 214. The position of the actuator 186 relative to the operator's seat 118 also enables the operator to move the baffle plate 178 without having to get up from the seat 118.

The actuation of the discharge chute 182 allows for more convenient transportation or storage of the lawn mower 110. Moving the discharge chute 182 to the second position reduces a width of the lawn mower 110. This allows the lawn mower 110 to fit into a smaller space (e.g., a truck bed, a trailer, a garage, etc.).

Various features and advantages of the invention are set forth in the following claims.

What is claimed is:
1. A lawn mower comprising:
a frame;
a prime mover supported by the frame;

a plurality of ground engagement elements moveably coupled to the frame and driven by the prime mover to propel the lawn mower;

a cutting deck pan supported by the frame, the cutting deck pan defining an opening;

a cutting blade mounted below the cutting deck pan to cut vegetation under the cutting deck pan; and a discharge baffle assembly coupled to the cutting deck pan adjacent the opening, the discharge baffle assembly including a discharge chute extending outwardly from the cutting deck pan, the discharge chute defining a passageway configured to direct cut vegetation out from the opening of the cutting deck pan, a baffle plate movable within a gap between the discharge chute and the cutting deck pan, the baffle plate being movable between a first position, in which the baffle plate substantially covers the opening of the cutting deck pan, and a second position, in which the baffle plate is spaced apart from the opening of the cutting deck pan, and an actuator coupled to the baffle plate, the actuator operable to move the baffle plate relative to the opening of the cutting deck pan;

wherein the baffle plate includes a first section positioned on top of the cutting deck pan and a second section positioned within the gap, wherein the first section has a first edge pivotably coupled with respect to the cutting deck pan and a second edge opposite the first edge, wherein the second section has an edge pivotably coupled to the second edge of the first section, and wherein the actuator is coupled to the baffle plate adjacent the second edge of the first section and the edge of the second section to move the second section within the gap.

2. The lawn mower of claim 1, wherein the baffle plate translates in a substantially vertical direction between the first position and the second position.

3. The lawn mower of claim 1, wherein the discharge baffle assembly further includes a spring coupled to the baffle plate, the spring biasing the baffle plate towards the cutting deck pan.

4. The lawn mower of claim 1, wherein the baffle plate is retained in either the first position or the second position until an external force acts on the actuator.

5. The lawn mower of claim 1, further comprising an operator's seat supported by the frame, the actuator extending from the baffle plate towards the operator's seat, wherein the actuator includes an elongated rod extending from the baffle plate towards the operator's seat.

6. The lawn mower of claim 1, wherein the actuator includes an electric motor assembly and a link coupled to the baffle plate, the link configured to be driven by the electric motor assembly.

7. The lawn mower of claim 1, wherein the discharge baffle assembly further includes a discharge frame, wherein the discharge frame is supported on an upper surface of the cutting deck pan, and wherein the baffle plate and the discharge chute are movably coupled to the discharge frame.

8. The lawn mower of claim 7, wherein the cutting deck pan defines a mounting aperture adjacent the opening, wherein the discharge frame includes a mounting post, and wherein the mounting post is received in the mounting aperture to couple the discharge baffle assembly to the cutting deck pan.

9. The lawn mower of claim 1, wherein the discharge chute is movable relative to the cutting deck pan between a first chute position, in which the discharge chute extends in a substantially horizontal direction with respect to the cutting deck pan, and a second chute position, in which the discharge chute extends in a substantially vertical direction with respect to the cutting deck pan.

10. The lawn mower of claim 9, wherein the discharge chute is pivotable relative to the cutting deck pan between the first chute position and the second chute position.

11. The lawn mower of claim 9, wherein the discharge chute and the baffle plate are movable relative to the cutting deck pan independently of one another.

12. A discharge baffle assembly for use with a lawn mower, the lawn mower including a frame, a prime mover supported by the frame, a plurality of ground engagement elements moveably coupled to the frame and driven by the prime mover to propel the lawn mower, a cutting deck pan supported by the frame, the cutting deck pan defining an opening, and a cutting blade mounted below the cutting deck pan to cut vegetation under the cutting deck pan, the discharge baffle assembly comprising:

a discharge frame configured to be coupled to the cutting deck pan adjacent the opening;

a discharge chute supported by the discharge frame and configured to extend outwardly from the cutting deck pan, the discharge chute defining a passageway configured to direct cut vegetation out from the opening of the cutting deck pan;

a baffle plate supported by the discharge frame and movable within a gap between the discharge chute and the discharge frame, the baffle plate being movable between a first position, in which the baffle plate is configured to substantially cover the opening of the cutting deck pan, and a second position, in which the baffle plate is configured to be spaced apart from the opening of the cutting deck pan; and an actuator coupled to the baffle plate, the actuator operable to move the baffle plate relative to the opening of the cutting deck pan;

wherein the baffle plate includes a first section positioned on top of the discharge frame and a second section configured to be positioned within the gap, wherein the first section has a first edge pivotably coupled to the discharge frame and a second edge opposite the first edge, wherein the second section has an edge pivotably coupled to the second edge of the first section, and wherein the actuator is coupled to the baffle plate adjacent the second edge of the first section and the edge of the second section to move the second section within the gap.

13. The discharge baffle assembly of claim 12, further comprising a spring coupled between the first section and the second section, the spring biasing the second section towards the discharge frame.

14. The discharge baffle assembly of claim 12, wherein the discharge chute is movable relative to the discharge frame between a first chute position, in which the discharge chute is configured to extend in a substantially horizontal direction with respect to the cutting deck pan, and a second chute position, in which the discharge chute is configured to extend in a substantially vertical direction with respect to the cutting deck pan.

15. The discharge baffle assembly of claim 14, wherein the baffle plate and the discharge chute are movable relative to the discharge frame independently of one another.

16. The discharge baffle assembly of claim 12, wherein the baffle plate is retained in either the first position or the second position until an external force acts on the actuator.

17. The discharge baffle assembly of claim 12, wherein the actuator includes an elongated rod extending generally upward from the baffle plate.

18. The discharge baffle assembly of claim 12, further comprising a plurality of mounting brackets coupled to the discharge frame, wherein the plurality of mounting brackets is coupled to the baffle plate and the discharge chute to allow relative rotation between the baffle plate and the discharge chute relative to the discharge frame.

19. The discharge baffle assembly of claim 12, wherein the actuator includes an electric motor assembly and a link coupled to the baffle plate, the link configured to be driven by the electric motor assembly.

\* \* \* \* \*